United States Patent Office 3,046,149
Patented July 24, 1962

3,046,149
ASPHALTIC BITUMINOUS COMPOSITIONS
Howard V. Moore, Gayle D. Edwards, and Myrl Lichtenwalter, Austin, Tex., assignors to Jefferson Chemical Company, Inc., Houston, Tex., a corporation of Delaware
No Drawing. Filed Apr. 13, 1959, Ser. No. 805,689
13 Claims. (Cl. 106—273)

The present invention relates to a novel bituminous containing composition and the preparation thereof. More particularly, the invention relates to a novel asphalt mixture comprising asphalt in combination with and additive which improves the adherence of asphalt to dry or wet mineral aggregates and which is also thermally stable in admixture with asphalt at elevated temperatures customarily employed in preparing, storing and utilizing asphalt.

The additive consists of a member selected from the group consisting of a high boiling amine residue formed as a by-product in the manufacture of piperazine and the condensation product resulting from the reaction of an organic acid and said amine residue. The asphalt mixtures contemplated herein are particularly suitable as pavings for roadways and the like in that even after being subjected to elevated temperatures for extended periods they readily and thoroughly coat dry or water-wet mineral aggregate with tenaciously adherent asphalt films which after asphalt solvents evaporate remain intact even when immersed in water for extended periods. Within the definition of the term "asphalt" we include asphalts cut back with solvent (asphalt cutback) as well as pure asphalt.

Most failures in asphalt roads are caused by the action of water which in its various forms deteriorates the paved surface. Damage from water results because mineral aggregates usually have a greater affinity for water than for asphalt. This is evidenced by the fact that it is virtually impossible to coat wet aggregates with standard asphalt compositions. Further evidence is the displacement or stripping of asphalt from aggregate by water is finished highways.

One of the more popular and still widely practiced methods used to lessen the deleterious effect of water on asphalt paving is to apply hot asphalt to thoroughly dry aggregate and roadbeds. Specific examples of such aggregate are river gravel, crushed granite, rhyolite, sand, quartz, limestone, dolomite and the like. This treatment gives an asphalt-aggregate bond not immediately affected by water. However, even this treatment does not prevent water from eventually penetrating imperfections in the asphalt films and stripping the aggregate of its asphalt coating. This stripping action is often accelerated by repeated freezing and thawing and results in rapid deterioration of the paving. Another disadvantage of the dry paving technique is that it requires dry weather. This requirement is a problem of great magnitude in all areas but is particularly troublesome in northern areas where suitable dry paving weather is limited. However, even in dry weather, aggregates stored outside in deep piles are seldom dry because of previous precipitation such as rain, snow or dew and must be dried at considerable expense before use in dry paving technique.

In the past chemical additives for use in asphalt have been developed which promote the coating of wet aggregate with asphalt and prevent subsequent stripping of asphalt from aggregate by water. Many of these known asphalt additives, however, have poor heat stability, that is, tend to lose their effectiveness when heated in asphalt at the usual temperature of storage and handling. In addition, they are often costly and fail to satisfactorily promote the coating of the said aggregate.

An object of this invention is to provide the thermally stable bituminous compositions which readily and thoroughly coat and tenaciously adhere to dry or water-wet mineral aggregates for prolonged periods under adverse conditions.

Another object of our invention is to produce a bituminous composition in which the components thereof are of relatively low cost.

COMPLEX AMINE

The complex amine residues contemplated herein are obtained from reacting a compound selected from the group consisting of monoethanolamine, ethylenediamine and ethylene glycol with ammonia the subject of a commonly assigned copending application S.N. 780,961, filed on December 17, 1958, now abandoned. The desired high-boiling amine residues are obtained by removing certain fractions of the complex reaction product. Monoethanolamine, ethylenediamine and ethylene glycol are commonly derived from ethylene and may be represented by the formula R—$CH_2$—$CH_2$—R in which R represents the same or different radicals selected from the group consisting of hydroxyl and amino radicals.

Production of the complex amine reaction product from which the high-boiling amine components are obtained is accomplished by reacting monoethanolamine, ethylenediamine or ethylene glycol with ammonia at an elevated temperature and a superatmospheric pressure in the presence of hydrogen and a hydrogenation catalyst. This reaction may be conducted at a temperature from about 150 to 400° C. but is preferably conducted in the range of 200 to 275° C. The pressure employed may range from about 30 to about 400 atmospheres.

While the mol ratio of ammonia to monoethanolamine, ethylenediamine or ethylene glycol for this reaction may be in the range of 1:1 to 5:1, the mol amount of ammonia employed should be in excess over the mol amount of the companion reactant. Normally it will be in the order of about 2 to 3 mols of ammonia per mol of monoethanolamine and ethylenediamine and about 3 to 5 mols of ammonia per mol of ethylene glycol.

Hydrogen is essential for this reaction and should amount to a substantial part of the reaction atmosphere. As a rule there should be at least 10 and preferably between 20 and 200 atmospheres of hydrogen pressure employed.

A number of hydrogenation catalysts may be employed in this process. The preferred catalysts consist essentially of one or more substances selected from the group consisting of the metals copper, nickel, and cobalt, and their oxides. A mixed metal oxide catalyst of this type may conveniently be prepared by ignition of mixtures of the corresponding metal nitrate or carbonate salts.

When oxides of copper, nickel and cobalt are introduced as the catalyst, the oxides are reduced to metal or lower oxides by the hydrogen present in the reaction. Alternatively, however, these oxides may be prereduced by passing a stream of hydrogen over the oxides while heating them to 200–400° C., thereafter being brought into contact with the reactants.

The preferred catalysts may be employed with or without minor amounts of at least one normally non-reducible metal oxide from the group consisting of chromium oxide, molybdenum oxide, manganese oxide and thorium oxide. These non-reducible oxides promote the activity of the preferred catalyst and, accordingly are conveniently referred to as promoters.

Specific preferred catalyst compositions consist of 75% NiO, 22% CuO and 3% $Cr_2O_3$ (as a promoter), as well as the corresponding catalyst obtained by prereducing this oxide composition with hydrogen to form metallic nickel and copper along with chromium oxide.

The crude complex reaction product obtained from the above reaction is subjected to distillation at temperature up to about 150° C. at 50 mm. of mercury pressure absolute, or alternatively at a temperature up to about 200° C. under atmospheric pressure. This step effectively removes certain low-boiling materials leaving a high-boiling complex amine composition as an amine residue which may amount to upwards of 50% of the crude complex reaction product. A partial analysis of the complex residue determined a substantial portion thereof constituted N-substituted piperazines such as 1-(2-aminoethyl)piperazine and 1-(2-hydroxyethyl)piperazine.

The high-boiling amine residue obtained according to the foregoing method is generally a dark brown to black water-soluble material. It has a total amine content determined by HCl titration and stated in meq./g. (milliequivalents/gram) ranging from about 8 to 19. The hydroxyl content in meq./g. ranges from about 5.0 to about 7.0 and the molecular weight (Rast method) ranges from 115 to 140.

The following two examples illustrate the preparation of the high-boiling amine residue contemplated herein.

Example I 1242 grams of ethylene glycol and 1700 grams of ammonia were reacted in an aqueous slurry containing 200 grams of prereduced copper-nickel-chromium oxide catalyst (30 atom percent Ni, 64 atom percent Cu, and 6 atom percent Cr). The reaction was conducted in the presence of hydrogen at a temperature of 250–257° C. for two hours. The crude reaction product was distilled at a temperature up to 150° C. under 50 mm. of mercury pressure absolute to remove the low-boiling materials, leaving a substantial quantity of high-boiling amine residue. This material had a total amine content by titration of about 8.3 meq./g.

Example II

Monoethanolamine and ammonia were reacted in a heated reactor in the presence of a hydrogen atmosphere and in contact with 25 gallons of a nickel-copper-chromia catalyst supported on diatomaceous earth and formed into pellets. The monoethanolamine and ammonia in a 1:3 mol ratio were pumped up through the catalyst bed at a rate of 32 gallons of monoethanolamine per hour. The pressure was maintained at 3000 p.s.i.g. (pounds per square inch gauge) and the temperature at 240–256° C. The crude reaction product freed of ammonia and hydrogen was distilled at 50 mm. of mercury pressure absolute at a temperature up to 150° C. The lower-boiling materials which were distilled overhead were removed, leaving a high-boiling amine residue product amounting to 35.6% of the reaction product.

The high-boiling amine residues obtained by reacting monoethanolamine with ammonia in the manner described above are oily liquids having the following overall properties.

| Description of property: | Range |
| --- | --- |
| Nitrogen (micro Kjeldahl), percent | 27–31 |
| Total amine (HCl titration), milliequivalents/gram (meq./g.) | 10–19 |
| Primary amine (Van Slyke), meq./g | 4–9 |
| Secondary amine (Sigga), meq./g | 2–4 |
| Tertiary amine (Sigga), meq./g | 4–6 |
| Hydroxyl number | 5–7 |
| Acetyl number | 12–19 |
| Molecular weight (Rast) | 115–140 |
| 1-(2-aminoethyl)piperazine, wt. percent | 30–40 |
| 1-(2-hydroxyethyl)piperazine, wt. percent | 5–15 |

A specific high-boiling amine residue obtained by the monoethanolamine ammonia reaction is a black, viscous, water-soluble liquid having an initial boiling point at atmospheric pressure of 202° C., a nitrogen (micro Kjeldahl) content of 29.7%, a total amine content (HCl titration) in meq./g. of 16.3, a primary amine (Van Slyke) content of 7.3 meq./g., a secondary amine content (Sigga) of 2.3 meq./g., a tertiary amine content (Sigga) of 5 meq./g., a hydroxyl number of 5.84 meq./g., an acetyl number of 17.1 meq./g. and a molecular weight (Rast) of 125. This product is designated for further purposes below as Amine Residue A.

Modified amine residues may be obtained by subjecting the high-boiling amine residue exemplified by Amine Residue A to supplemental treatment or distillation to obtain distinct fractions of the high-boiling amine residue. Thus Amine Residue A was subjected to distillation to remove about 60% of the Amine Residue A as overhead. The water-soluble, colorless distillate (boiling range 202–298° C. at 1 atm.) and black residue were respectively designated as Amine Residue B and Amine Residue C having the following properties:

| Properties | Amine Residue B | Amine Residue C |
| --- | --- | --- |
| Nitrogen (Micro Kjeldahl), Percent | 30.6 | 27.5 |
| Total Amine (HCl Titration), meq./g | 17.45 | 11.86 |
| Primary Amine (Van Slyke), meq./g | 8.96 | 4.61 |
| Secondary Amine (Sigga), meq./g | 2.00 | 2.41 |
| Tertiary Amine (Sigga), meq./g | 5.42 | 4.64 |
| Hydroxyl Number, meq./g | 6.67 | 6.49 |
| Acetyl Number, meq./g | 18.7 | 13.7 |
| Molecular Weight (Rast) | 126 | 132 |

Another valuable amine residue product is obtained by subjecting the high-boiling amine residue exemplified by Amine Residue A to distillation to remove about 13% of Amine Residue A overhead, leaving a black residue designated for our purposes as Amine Residue D. Residue D has a hydroxyl content in meq./g. of 5.0, a total amine equivalent of 15.7 meq./g. and a molecular weight (Rast method) of about 125.

Still other examples of amine residues are contemplated herein are those designated Amine Residue E, Amine Residue F and Amine Residue G. Amine Residue E is the yellow to brown distillate (boiling range of 206° C. to 95% overhead at 326° C. at 1 atm.) resulting from the about 87% flash distillation of Amine Residue A and Amine Residue F is the black residue of such distillation. Amine Residue G consists of a mixture of one part of Amine Residue A and four parts of Amine Residue F. Some of the properties of Amine Residues E, F, and G are as follows:

| Properties | Amine Residue E | Amine Residue F | Amine Residue G |
|---|---|---|---|
| Nitrogen (Micro Kjeldahl), percent | 30.1 | 29.0 | 29.7 |
| Total Amine (HCl Titration), meq./g | 18.2 | 14.7 | 16.2 |
| Primary Amine (Van Slyke), meq./g | 8.3 | 7.2 | 7.3 |
| Secondary Amine (Sigga), meq./g | 2.1 | 3.1 | 2.3 |
| Tertiary Amine (Sigga), meq./g | 5.3 | 4.2 | 5.0 |
| Hydroxyl Number, meq./g | 6.5 | 6.9 | 6.1 |
| Acetyl Number, meq./g | 18 | 12.2 | 17.8 |
| Molecular Weight (Rast) | 125 | 135 | 128 |

AMINE RESIDUE-ACID CONDENSATION PRODUCT

In addition to the complex amine residues the reaction product of these amines and organic acids is also contemplated herein as an anti-stripping, adhesion and heat stability additive for asphalts and the cutbacks thereof.

Typical acids or acid reacting substances which have been employed in condensation reactions with amine residues to produce the condensation products include whole and distilled tall oil, tall oil fatty acids (46% linoleic, 51% oleic, 3% adipic and sebacic acid), tall oil rosin acids, distilled cottonseed acids and acidulated cottonseed foots (90% fatty acid, chiefly oleic acid), coconut oil acids (8% caprylic, 7% capric, 49% lauric, 17% myristic, 9% palmitic, 2% stearic, 6% oleic, and 2% linoleic acid), distilled soy bean acids, oleic acid, stearic acid, a mixture of linoleic and oleic acid, oxidized wax, hydrogenated tallow acids, natural occurring acids and mixtures comprising caprylic, palmitic, aluric, caproic, capric, linoleic, myristic and naphthenic acids. Other suitable acids including acetic, propionic, valeric, behenic, arachidic acids, mixed monomer, dimer, and trimer acids and dicarboxylic acids such as azelaic, sebacic, succinic, dilinoleic and isodecenyl succinic acids. Corresponding anhydrides or esters of acids and lower alkyl alcohols (e.g., methanol, ethanol) may be employed in place of the acids themselves. In general, the higher fatty carboxylic have from 8 to 22 carbon atoms of the formula $R'—(COOH)_n$ where $n$ is an integer from 1 to 3 inclusively and $R'$ is a radical selected from the group consisting of alkyl, cycloalkyl, alkylene, aryl, alkaryl, aralkyl and alkylidene.

As indicated above the condensation products of this invention are prepared by reacting an amine residue with an organic acid or acid mixture at an elevated temperature under atmospheric pressure. Higher or lower pressures may be employed but atmospheric pressure is convenient and preferable. The reaction may be conducted at a temperature in the range of 120–300° C. although it is preferable to effect condensation at 140–190° C. except for rosin acids where the preferred temperature range is 225–240° C.

The ratio of amine residue reacted with acid or acid reacting materials may be varied to considerable extent. This ratio based on the equivalent weight values of the amine residues and the organic acid or acid mixture has been found satisfactory over the range of 0.8:1 to 5:1 although higher and lower ratios may be employed. Preferred ratios for the reaction are from about 1:1 to about 3:1. The equivalent weight of the amines is determined by titrating the amine with hydrochloric acid to a pH of 3. The equivalent weight of acid is determined by titration with an aqueous sodium hydroxide solution to the phenolphthalein end point.

The reaction between the amine residue and acid or acid reacting substances is continued for a sufficient length of time to effect substantial condensation between the two reactants. The course of this reaction may be followed by collecting the water of condensation as it is distilled from the reaction product. Generally the reaction should preferably continue until at least about 50% of the theoretical amount of water of condensation has been collected overhead.

The condensation products contemplated herein may be prepared by weighing the desired quantities of reactants into a suitable reaction vessel. As their reactants are initially mixed there results a moderate rise in temperature from about 25 to 85° C. The vessel is then preferably fitted with a thermometer, stirrer, and condenser before proceeding further. An external source of heat is applied to raise the temperature of the reactants to 120–300° C. The reaction may be conducted under these conditions anywhere from 1–20 hours or longer depending on the size of the charge and the course of the reaction as indicated by the volume of water collected as overhead.

The following examples illustrate the preparation of the amine residue-acid condensation products contemplated herein. Solubility in the 1:1 isopropyl alcohol and water refers to a clear homogeneous solution at a 1% concentration of the product.

*Example III*

200 grams (3.4 equivalents) of Amine Residue A, heretofore described, and 422 grams (1.27 equivalents) of whole crude tall oil are placed in a 3-neck, 1 liter flask equipped with a stirrer, thermometer, and a downward condenser. After stirring for 1.5 hours at 167–183° C., 16 milliliters of water were collected as overhead which was 70.0% of theoretical. The condensation product was a black viscous liquid and weighed 603 grams. The product (Condensate P) was insoluble in water, soluble in hot 36–38° API gravity mineral base oil and produced a cloudy solution in a 1:1 solution of isopropyl alcohol and water.

*Example IV*

188 grams of Amine Residue E and 596 grams of tall oil fatty acids were admixed in a 3-neck reaction flask. On an equivalent basis this represented the amine to acid ratio of 1.5:1. External heat was applied and the reaction was conducted at 150–170° C. for 4.3 hours during which time 33 milliliters of distillate water (92% of theoretical) were collected as overhead. The recovered amine-acid condensation product was a brown paste insoluble in water, soluble in hot mineral base oil of 36–38° API gravity and produced a cloudy solution in 1:1 solution of isopropyl alcohol and water. This product was designated as Condensate F and weighed 751 grams.

*Example V*

200 grams of Amine Residue E and 451 grams of oleic acid were admixed in a 3-neck reaction vessel. On an equivalent basis this represented an amine to acid ratio of 2:1. External heat was applied and the reaction was conducted at 160–180° C. for one hour during which time 28 milliliters of distillate water (97% of theoretical) were collected as overhead. The recovered condensation product (Condensate G) weighed 621 grams. It was insoluble in water, soluble in hot 36–38° API gravity mineral base oil and produced a cloudy solution in a 1:1 solution of isopropyl alcohol and water.

Further examples of amine residue-acid condensates which were prepared are found below in Table I.

TABLE I.—SUMMARY OF PREPARATION OF CONDENSATES

| Condensate | Reaction Data | | | | | | | | Product Data | |
|---|---|---|---|---|---|---|---|---|---|---|
| | Amine Residue | Grams, Amine Residue | Acid [1] | Grams, Acid | Ratio [2] | Reac. time, hrs. | Reac. temp., °C. | $H_2O$ Distillate, mls. | Weight, Grams | Physical State |
| A | E | 75 | TOF | 715 | 0.5 | 2 | 150–175 | ([3]) | 774 | black liquid. |
| B | E | 125 | TOF | 745 | 0.8 | 2.5 | 155–180 | ([3]) | 850 | brown paste. |
| C | A | 90 | CSF | 475 | 1 | 1.5 | 150–180 | 24.8 | 537 | black paste. |
| D | E | 63 | CSF | 317 | 1 | 3 | 160–175 | 16 | 358 | Do. |
| E | E | 125 | TOF | 596 | 1 | 3.3 | 150–170 | 28.2 | 691 | brown paste. |
| F | E | 188 | TOF | 596 | 1.5 | 4.3 | 150–170 | 33 | 751 | Do. |
| G | E | 200 | O | 451 | 2 | 1 | 160–180 | 28 | 621 | tan paste. |
| H | E | 200 | C | 336 | 2 | 1.2 | 160–180 | 23 | 536 | brown grease. |
| I | E | 200 | TOD | 470 | 2 | 6 | 150–175 | 15.5 | 654 | brown paste. |
| J | E | 188 | TOF | 447 | 2 | 3 | 150–165 | 23.0 | 611 | Do. |
| K | E | 188 | TOF | 335 | 2.5 | 4.2 | 150–180 | 16.2 | 505 | Do. |
| L | A | 200 | TOC | 422 | 2.7 | 1.5 | 170–180 | 16 | 603 | black liquid. |
| M | A | 200 | TOD | 374 | 2.7 | 3 | 150–170 | 15 | 558 | Do. |
| N | E | 188 | TOF | 298 | 3.0 | 3 | 150–170 | 15 | 470 | brown paste. |
| O | A | 365 | TOD | 374 | 4.9 | 2.6 | 150–180 | 12.5 | 726 | black liquid. |
| P | A | 200 | TOC | 422 | 2 | 1.5 | 167–183 | 16 | 603 | Do. |

[1] TOF=tall oil fatty acids; TOD=tall oil, distilled; TOC=crude tall oil; CSF=acidulated cottonseed foots; C=coconut oil fatty acids; O=oleic acid.
[2] Ratio of amine residue weight equivalents to acid weight equivalents.
[3] Reactions conducted in open vessel; no distillate was collected.

THE NOVEL ASPHALT COMPOSITION

Within the scope of the term "asphalt" we include asphaltic rocks, tars and pitches, petroleum residuums, coal tars, etc., and the cutbacks thereof. The adhesion additives contemplated herein are particularly adapted for use with asphalt from petroleum sources.

The asphalts employed in accordance with the invention may be any of the above materials or a mixture thereof with or without being combined with solvent. When an asphalt is mixed with a solvent it is known as a "cutback." An uncut asphalt is usually viscous, plastic, or even solid at ordinary temperatures. It is usually applied to a surface to be coated after the asphalt has been heated to soften it. The cutbacks are produced by fluxing the asphalt with a suitable solvent such as a naphtha or similar hydrocarbon. Normally asphalt cutbacks consist of about 10 to 60% solvent. Cutback asphalts are "cured" by allowing the solvent to evaporate.

Specific examples of asphalts suitably combined with the additives contemplated herein are petroleum asphalts having a penetration (100 g., 5 sec.) at 77° F. between 40 and 300 and a ring and ball softening point between 86 and 150° F. Specific examples of asphalt cutbacks contemplated herein are those officially designated by the Asphalt Institute as RC (rapid curing) –0, RC–1, RC–2, RC–3, RC–4, RC–5, MC (medium curing) –0, MC–1, MC–2, MC–3, MC–4, MC–5, SC (slow curing) –0, SC–1, SC–2, SC–3, SC–4, SC–5. An illustrative example of a typical asphalt-naphtha cutback is RC–2 having the following properties.

Viscosity at 140° F., Saybolt Furol _____ 100–200
Flash point, °F. (Tag open-cup), min_____ 80
Distillation to 680° F. distillate, °F.:
    40% overhead (minimum volume)_____ 437
    65% overhead (minimum volume)_____ 500
    87% overhead (minimum volume)_____ 600
Residue at 680° F. (percent total volume, by dif.) min_____ 67
Penetration at 77° F. (100 g., 5 sec.)_____ 80–120
Ductility at 77° F., cm., min_____ 100
Solubility in $CCl_4$, percent, min_____ 99.5
Water, percent by weight, max_____ 0

We have found that by incorporating the additive in quantities between about .05 and 5%, preferably between 0.1 and 1.5%, said percent based on the weight of the asphalt or asphalt cutback depending on which type of component is employed in the bituminous composition, outstanding anti-stripping, adhesion and heat stability properties are imparted to asphalts and asphalt cutbacks.

The asphalt-additive compositions of the invention are normally prepared by adding the additive to asphalt with mixing at a temperature above the softening point of the asphalt in order to promote the uniform distribution of the additive throughout. If asphalt cutback is employed it is preferable to first mix the additive with heated asphalt and then cut back the heated mixture with solvent to the desired consistency; however, the additive may be added to the asphalt subsequent to the addition of solvent.

TEST PROCEDURES AND DATA

The asphalt used throughout the subsequent test is an air blown petroleum vacuum residuum of 85–100 penetration (100 g. 5 sec.) at 77° F. and of a ring and ball softening point of 110–125° F.

Two additive blending procedures respectively designated as Blending Procedure A and Blending Procedure B were employed:

A. 75 parts of asphalt were mixed with 25 parts of naphtha at 200° F. The resulting asphalt cutback was classified as an RC–2 cutback. To 100 parts of the formed RC–2 cutback there was added the desired quantity of adhesion additive with mixing at 150° F. The resulting additive-containing RC–2 cutback was stored in a closed container at 140° F. from 0 to 282 days depending on test requirements prior to subjecting it to the subsequently described initial coating and immersion tests.

B. One part adhesion additive was mixed with 100 parts asphalt at 220–250° F., and the resulting mixture was stored in a sealed container at 350° F. from 1 to 28 days depending on test requirements. After storage for the desired time, the asphalt-additive blend was cooled to 200° F. and 75 parts of said blend was mixed with 25 parts naphtha to form an RC–2 cutback.

In the above two blending procedures the purpose of storing the asphalt compositions at elevated temperatures was to measure the combined effects of thermal decomposition and chemical reaction of the additive which might occur to render the additive ineffective. If an additive is heat stable in asphalt (asphalt cutback), prolonged storage in heated asphalt does not appreciably reduce its ability to promote the coating of mineral aggregates nor its ability to retain the asphalt coating upon aggregates when immersed in water. An important reason for having heat stable bituminous compositions is that often under paving conditions bituminous compositions are subjected to elevated temperatures for extended periods of time.

The adhesion testing procedures employed are as follows:

(1) *Initial coating test procedures.*—To a previously fired and cooled seamless can of 8-ounce capacity there is added 50 grams of mineral aggregate (such as gravel or rhyolite) which has been previously screened to pass a screen of ⅜" mesh and retained upon a screen ¼" mesh and which has been washed in distilled water and allowed to air dry for at least 24 hours. One gram of distilled water is added to the can and the can is closed. Vigorous shaking of the can for 1 to 1½ minutes is employed to thoroughly wet the entire surface of the mineral aggregate therein. Then 3 grams of the above-described additive-containing RC-2 cutback, previously heated in a closed container to 140° F., are added to the wet aggregate. These ingredients are then mixed with a stainless steel spatula until no additional aggregate is coated by the asphalt cutback through additional mixing. Generally less than 5 minutes mixing is sufficient. The aggregate is observed under adequate light from time to time during the mixing and the percent of the aggregate coated by asphalt composition is determined by visual inspection. The percent coated is equal to 100 minus the number of aggregate particles which are not totally coated by asphalt composition. In subsequent Tables II and III the initial coating test results are reported under the heading "Initially."

(2) *Immersion (stripping) test procedure.*—Water-wet aggregates coated by asphalt compositions as described in the initial coating test procedure above are placed in an oven maintained at 140° F. for one hour to cure. After this curing cycle the aggregate is mixed for about two minutes to insure obtaining the best possible coating of aggregate by asphalt and the coated aggregate is transferred to a 600 ml. beaker containing 400 ml. of distilled water. After 15–18 hours of static immersion at room temperature the immersed coated aggregate is inspected and the percent of the aggregate coated by asphalt is determined visually as described previously in the initial coating test procedure. In subsequent Tables II and III the immersion test results are reported under the heading "After Immersion."

The data obtained employing the above test methods appears in the tables below:

TABLE II.—ADHESION, STRIPPING AND HEAT STABILITY DATA OF 0.75% AMINE RESIDUE IN RC-2 CUTBACKS

| Amine Additive | Aggregate | Blending Procedure [1] | Storage Time, days [1] | Percent Aggregate Totally Coated with Asphalt | |
|---|---|---|---|---|---|
| | | | | Initially | After Immersion |
| None | Rhyolite | A | 0 | 5–10 | 0 |
| Do | Gravel | A | 0 | 10–15 | 25 |
| Amine Residue A | do | A | 0 | 15–20 | 40–45 |
| Do | Rhyolite | A | 121 | 98 | 100 |
| Amine Residue C | Gravel | A | 0 | 70–80 | 70–75 |
| Do | Rhyolite | A | 20 | 90 | 99 |
| Amine Residue D | do | A | 121 | 98 | 96 |
| Do | do | B | 1 | 100 | 100 |
| Do | do | B | 7 | 100 | 100 |
| Do | do | B | 28 | 100 | 100 |
| Amine Residue F | Gravel | A | 0 | 80–85 | 80–85 |
| Do | Rhyolite | A | 20 | 96 | 99 |
| Do | do | A | 282 | 99 | 98 |
| Amine Residue G | Gravel | A | 0 | 70–75 | 80–85 |

[1] Blending procedure A (explained previously) involves mixing the additive in cutback asphalt and storage at 140° F. Blending procedure B (explained previously) involves mixing the additive into penetration grade asphalt and storage at 350° F. Then cutback was prepared from this mixture.

ADHESION, STRIPPING AND HEAT STABILITY DATA OF AMINE RESIDUE-ORGANIC ACID CONDENSATION PRODUCTS IN RC-2 CUTBACKS

| Condensate Additive [1] | Blending Procedure [2] | Additive content, wt. percent in cutback | Storage Time,[2] Days | Percent Rhyolite Aggregate Totally Coated with Asphalt | |
|---|---|---|---|---|---|
| | | | | Initially | After Immersion |
| None | A | 0 | 0 | 5–10 | 0 |
| A | A | 0.75 | 0 | 75–80 | 5–10 |
| B | A | 0.75 | 0 | 97 | 5–10 |
| C | B | 0.75 | 1 | 70–98 | 80–98 |
| D | A | 0.75 | 0 | 100 | 75–80 |
| D | A | 0.75 | 5 | 95 | 90 |
| E | A | 0.75 | 0 | 100 | 95 |
| E | A | 0.75 | 5 | 100 | 85–90 |
| E | B | 0.75 | 1 | 80 | 80 |
| F | A | 0.75 | 0 | 100 | 100 |
| F | A | 0.75 | 5 | 100 | 100 |
| F | A | 0.75 | 210 | 100 | 96 |
| F | B | 0.75 | 1 | 100 | 99 |
| F | B | 0.75 | 3 | 100 | 100 |
| G | B | 0.75 | 1 | 100 | 100 |
| G | B | 0.75 | 7 | 100 | 98–100 |
| H | B | 0.75 | 1 | 97–100 | 100 |
| H | B | 0.75 | 7 | 100 | 100 |
| H | B | 0.75 | 28 | 97 | 97 |
| I | A | 0.75 | 0 | 100 | 100 |
| I | A | 0.75 | 5 | 100 | 98 |
| I | A | 0.75 | 210 | 100 | 94 |
| I | A | 0.3 | 0 | 98 | 98 |
| J | A | 0.75 | 0 | 100 | 100 |
| J | A | 0.75 | 5 | 100 | 99 |
| J | A | 0.75 | 210 | 100 | 91 |
| K | A | 0.75 | 5 | 100 | 99 |
| K | A | 0.75 | 168 | 100 | 96 |
| L | A | 0.75 | 18 | 99 | 100 |
| L | A | 0.75 | 282 | 100 | 98 |
| L | A | 0.3 | 0 | 98 | 94 |
| M | A | 0.75 | 5 | 100 | 99 |
| M | A | 0.75 | 210 | 100 | 97 |
| N | A | 0.75 | 5 | 100 | 98 |
| N | A | 0.75 | 210 | 100 | 99 |
| O | A | 0.75 | 5 | 100 | 99 |
| O | A | 0.75 | 110 | 100 | 98 |
| K | A | 1.0 | 0 | 100 | 98 |
| P | A | 0.3 | 0 | 97 | 90 |

[1] See Table I.
[2] Blending Procedure A (explained previously) involves mixing the additives in cutback asphalt and storage at 140°F. Blending Procedure B (explained previously) involves mixing the additive in penetration grade asphalt and storage at 350°F. Then cutback was prepared from this mixture.

The above data show bituminous compositions containing the amine residue or the organic condensation product thereof effectively coat water-wet aggregates even after long periods of heating as simulated by the extended heating of the asphalt-additive compositions prior to or after cutting back with naphtha and testing. Furthermore, it is seen that mineral aggregates coated with bituminous compositions containing these amine residues and condensates thereof retain their cured asphalt-coating even after prolonged immersions in water.

To further demonstrate the outstanding adhesion and heat stability qualities of our novel bituminous compositions, a comparative bituminous composition containing a commercial adhesion additive mixture of the formula

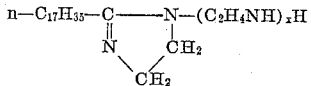

where $x=0-3$ was tested. The comparative bituminous composition was prepared employing the previously described Blending Procedure B. The storage period of additive in 85–100 penetration asphalt was two days at 350° F.

The comparative bituminous composition when subjected to the initial coating test was found to coat only 5–7% of the rhyolite mineral aggregate and was found coat none of the rhyolite aggregate after being subjected to the immersion test. These tests indicated the effectiveness of the commercial additive was substantially destroyed by the 2 day storage period at 350° F. In contradistinction, Tables II and III show the novel compositions contemplated herein treated and tested under similar conditions coated up to 100% of the rhyolite before and after immersion.

All percentages, parts and ratios heretofore and hereafter recited are based on weight unless otherwise stated.

Obviously, many modifications and variations of the invention, as hereinbefore set forth, may be made without departing from the spirit and scope thereof, and therefore only such limitations should be imposed as are indicated in the appended claims.

We claim:

1. A bituminous composition comprising asphalt and a member selected from the group consisting of amine residue and the condensation product of amine residue and organic acid, said amine residue being produced by reacting a compound selected from the group consisting of monoethanolamine, ethylenediamine and ethylene glycol with ammonia at a temperature in the range of 150–400° C. and a pressure of 30–400 atmospheres in the presence of hydrogen and a hydrogenation catalyst and subjecting said reaction product to distillation to remove the low-boiling amine product and recover a high-boiling amine composition characterized by a minimum boiling point of about 150° C. at 50 mm. of mercury pressure as said amine residue, said condensation product being produced by reacting an organic acid represented by the formula $R'-(COOH)_n$ in which $n$ equals an integer from 1 to 3 and R' represents a hydrocarbon radical having from 1 to 36 carbon atoms, with said amine residue at a temperature above about 120° C. to form said amine residue-organic acid condensation product.

2. A bituminous composition in accordance with claim 1 in which said high-boiling amine composition is subjected to distillation to distill about 13% of said high-boiling composition overhead and leaving a residual amine product as said amine residue.

3. A bituminous composition in accordance with claim 1 in which said high-boiling amine composition is subjected to distillation to distill about 60% of said high-boiling amine overhead thereby producing a flashed amine product overhead as said amine residue.

4. A bituminous composition in accordance with claim 1 in which said high-boiling amine composition is subjected to distillation to distill about 60% of said higher boiling amine composition overhead and leaving a residual amine product as said amine residue.

5. A bituminous composition in accordance with claim 1 wherein said high-boiling amine composition is subjected to flash distillation to distill about 87% of said high-boiling amine composition overhead thereby producing a flashed amine product overhead as said amine residue.

6. A bituminous composition comprising asphalt and .05 to 5% by weight of a member selected from the group consisting of amine residue and a condensation product of said amine residue and organic acid represented by the formula $R'-(COOH)_n$ in which $n$ equals an integer from 1 to 3 and R' represents a hydrocarbon radical selected from the group consisting of alkyl, cycloalkyl, alkylene, aryl, alkaryl, aralkyl and alkylidene radicals having from 1 to 36 carbon atoms said amine residue being produced by reacting monoethanolamine and ammonia at a temperature in the range of 150 to 400° C. and a pressure of 30–400 atmospheres in the presence of hydrogen and a hydrogenation catalyst the mol ratio of said ammonia to said monoethanolamine between 1:1 and 5:1, to form an amine reaction product, subjecting said amine reaction product to distillation at a temperature up to about 150° C. under a pressure of 50 mm. of mercury pressure absolute to remove the lower boiling amine products and recovering a high-boiling amine as said amine residue, said condensation product being formed by reacting said amine residue and said organic acid in an equivalent ratio of between 0.8:1 and 5:1 at a temperature between 120 and 300° C.

7. A bituminous composition in accordance with claim 6 wherein said ammonia and said monoethanolamine are reacted at a temperature of 200 to 275° F., said hydrogen catalyst selected from the group consisting of oxides of copper, nickel, cobalt and chromium, said mole ratio of said ammonia to said monoethanolamine between 1:1 and 1.5:1.

8. A bituminous composition in accordance with claim 6 wherein said organic acid is tall oil.

9. A bituminous composition in accordance with claim 6 wherein said organic is oleic acid.

10. A bituminous composition in accordance with claim 6 wherein said organic acid is coconut oil fatty acids.

11. A bituminous composition in accordance with claim 1 wherein said asphalt is an asphalt cutback containing about 10–60% solvent.

12. A method of preparing a bituminous composition comprising mixing asphalt and a member selected from the group consisting of amine residue and the condensation product of amine residue and organic acid, said amine residue being produced by reacting a compound selected from the group consisting of monoethanolamine, ethylenediamine and ethylene glycol with ammonia at a temperature in the range of 150–400° C. and a pressure of 30–400 atmospheres in the presence of hydrogen and a hydrogenation catalyst and subjecting said reaction product to distillation up to about 150° C. under 50 mm. of mercury pressure to remove the low-boiling amine product and recover a high-boiling amine composition as said amine residue, said condensation product being produced by reacting an organic acid represented by the formula $R'-(COOH)_n$ in which $n$ equals an integer from 1 to 3 and R' represents a hydrocarbon radical having from 1 to 36 carbon atoms, with said amine residue at a temperature above about 120° C. to form said amine residue and acid condensation product.

13. A method of preparing a bituminous composition comprising mixing asphalt and .05 to 5% by weight of a member selected from the group consisting of amine residue and a condensation product of said amine residue and organic acid represented by the formula $R'-(COOH)_n$ in which $n$ equals an integer from 1 to 3 and R' represents a hydrocarbon radical selected from the group consisting of alkyl, cycloalkyl, alkylene, aryl, alkaryl, aralkyl and alkylidene radicals having from 1 to 36 carbon atoms, said amine residue being produced by reacting monoethanolamine and ammonia at a temperature in the range of 150 to 400° C. and a pressure of 30–400 atmospheres in the presence of hydrogen and a hydrogenation catalyst, the mol ratio of said ammonia to said monoethnolamine between 1:1 and 5:1, to form an amine reaction product, subjecting said amine reaction product to distillation at a temperature up to about 150° C. under a pressure of 50 mm. of mercury pressure absolute to remove the lower boiling amine products and recovering a high-boiling amine as said amine residue, said condensation product being formed by reacting said amine residue and said organic acid in an equivalent ratio of between 0.8:1 and 5:1 at a temperature between 120 and 300° C.

References Cited in the file of this patent

UNITED STATES PATENTS

| | | |
|---|---|---|
| 2,361,488 | Mikeska | Oct. 31, 1944 |
| 2,508,652 | Ross | May 23, 1950 |
| 2,534,713 | Hankins | Dec. 19, 1950 |
| 2,540,678 | Kelley | Feb. 6, 1951 |